July 18, 1967     W. F. ANDERSON ET AL     3,331,575

PRECISION POSITIONING SYSTEM

Filed March 1, 1965     3 Sheets-Sheet 1

INVENTOR.
WILLIAM F. ANDERSON
STANLEY HELLER
BY
*Curtis Ailes*
ATTORNEY

July 18, 1967   W. F. ANDERSON ET AL   3,331,575
PRECISION POSITIONING SYSTEM
Filed March 1, 1965   3 Sheets-Sheet 3

INVENTOR.
WILLIAM F. ANDERSON
STANLEY HELLER
BY
ATTORNEY

United States Patent Office 3,331,575
Patented July 18, 1967

3,331,575
PRECISION POSITIONING SYSTEM
William F. Anderson, Peekskill, N.Y., and Stanley Heller, Philadelphia, Pa., assignors to Itek Corporation, Lexington, Mass., a corporation of Delaware
Filed Mar. 1, 1965, Ser. No. 436,183
5 Claims. (Cl. 248—180)

This invention relates to precision positioning systems, and to novel bearing structures useful in such systems. The invention relates more particularly to precision systems for adjustably positioning an apparatus in a particular plane and for maintaining the apparatus in the selected plane. The present invention relates to precision positioning systems which are particularly useful for purposes such as in optical apparatus wherein changes of position are required, such as for focusing.

In certain applications for such apparatus, it is very important to provide for precision adjustment of the attitude of the plane of operation of the apparatus, and then to provide for rapid adjustment by a translational motion of the plane without any change in the attitude of the plane.

Accordingly, it is an object of the present invention to provide a positioning system which is capable of precision adjustment of the attitude of a plane and which is also capable of more rapid translational adjustment in the position of the plane without change in the attitude thereof.

Precision positioning systems for positioning a single point and for adjusting the position of that point are relatively simple and well known. However, the present invention is concerned with the more complicated objective of adjusting the attitude of a plane and of then having a rapid adjustability of the position of that plane without changing the attitude of the plane.

High precision positioning systems generally involve the use of screw threads with very close tolerances, spring members to take up lost motion, and various measures which are likely to add to the frictional forces resisting adjustment motion. The increase of any such friction not only increases the energy requirements for adjustment, but also increases the tendency of the apparatus to "stick" and to move only intermittently, rather than smoothly. The result is that precision adjustment is difficult. In brief, friction "sticking" and precision motion do not go well together.

Accordingly, it is another object of the present invention to provide a precision positioning system of the above description which is particularly characterized by low friction and high precision.

One of the most effective methods for reducing friction in any machine is to incorporate anti-friction bearings such as ball bearings or roller bearings. However, by the very nature of such bearings, their use generally involves the introduction of a certain amount of lost motion in the bearing connection established by the anti-friction bearing. Such lost motion is obviously disadvantageous in precision positioning systems.

Accordingly, it is another object of the present invention to provide a precision positioning system of the above description incorporating the advantages of anti-friction bearing connections without the disadvantage of lost motions.

In certain optical apparatus, such as apparatus for the recordation of data by photographic means on the face of a disk, for instance, it is very important to provide a focusing system which is translationally movable for focusing the optical data signals to be recorded accurately and consistently upon the face of the disk. For this purpose, it is important that the translational movement apparatus must have an accurately positioned attitude in space in a plane which is substantially parallel to the plane of optical focus, and yet which is adjustable rapidly in a direction substantially perpendicular to the plane of focus in order to accomplish fine focusing of the system.

Accordingly, it is another object of the present invention to provide a precision positioning system for application to optical apparatus, and which is capable of precision adjustment to an infinite variety of positions within certain limits to position the plane of operation for an optical focusing system, and which is rapidly adjustable to an infinite variety of positions within limits in order to establish the focus of the optical system without changing the attitude of the plane.

In carrying out the above objects and in achieving the above advantages of the invention, in one preferred form thereof there may be provided a precision positioning system including a platform having at least three mountings. Mutually parallel lead screws are connected to support the platform at each of the mountings. The mountings each have a self-aligning bearing including a nut threadedly engaging the associated lead screw for establishing a connection between the lead screw and the platform. A common drive system is connected for simultaneous adjustment between said mounting nuts and said lead screws. At least two of the mountings are adjustable independently of each of the others for thereby adjusting the attitude of the platform. A first one of the mountings has two degrees of freedom with relation to the platform for adjusting movement transversely to the associated lead screw, and a second one of the mountings has one degree of freedom with relation to the platform for adjusting movement transversely to the associated lead screw and in a direction in alignment with the third one of the mountings.

The self-aligning bearings may each be angular contact spherical anti-friction bearings.

Further objects and advantages of the invention will be apparent from the following description and the accompanying drawings as follows.

Figure 3:
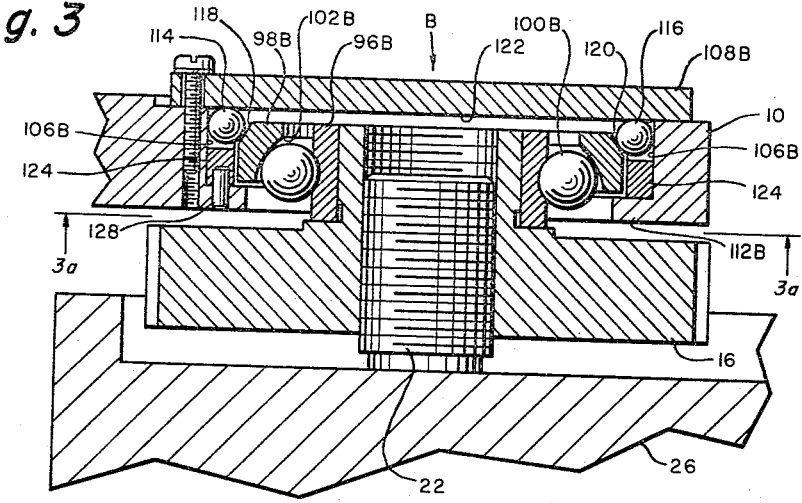
FIG. 3 is a cross-sectional view similar to FIG. 2 showing only the details of the mounting B in the embodiment of FIG. 1.
Figure 3B:
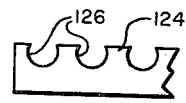
FIG. 3a is a cross-sectional bottom view taken at 3a—3a of FIG. 3.

And FIG. 3b is a detail illustrating the construction of a bearing ball separator employed in mounting B.

Figure 1:
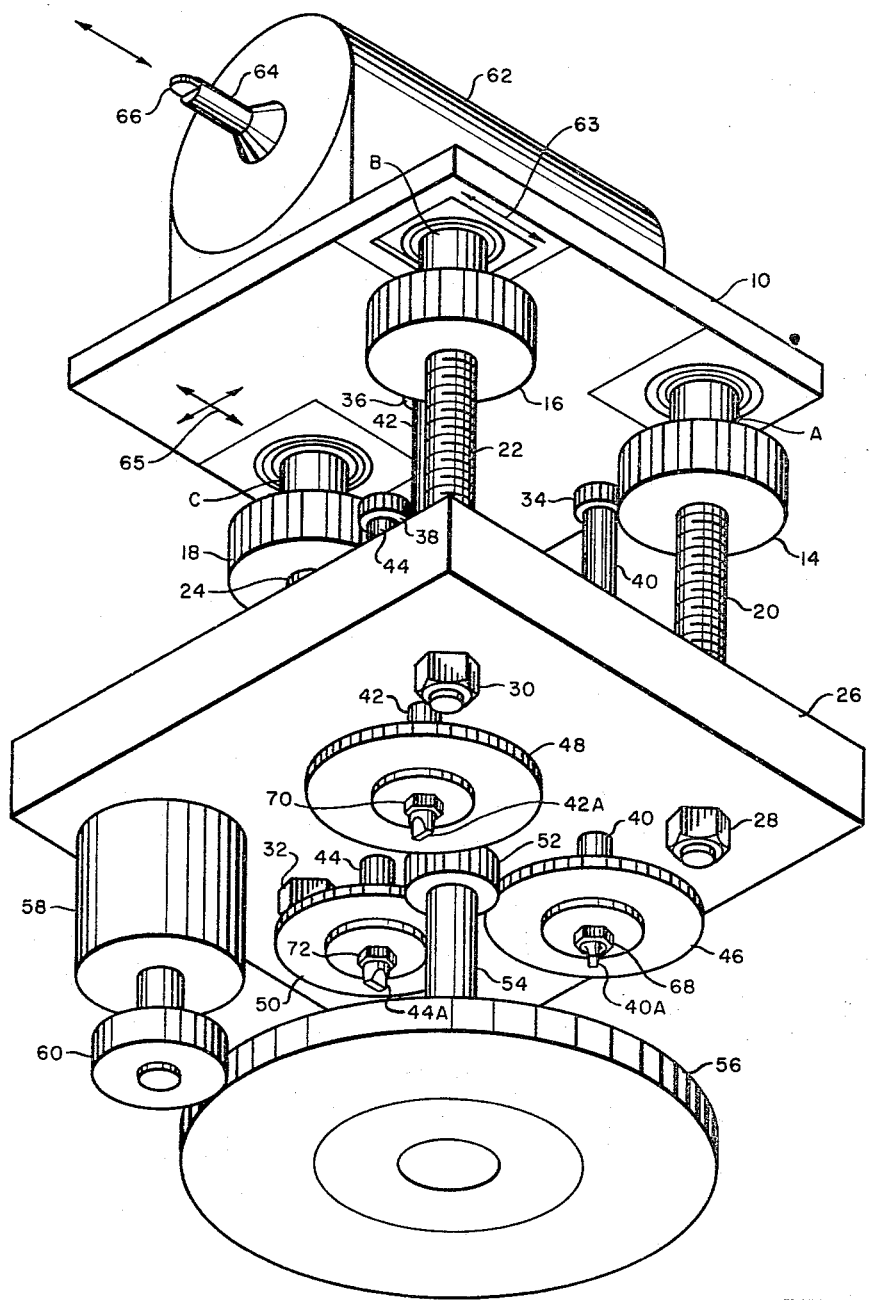
FIG. 1 is a vertically expanded isometric drawing illustrating the general organization of a preferred embodiment of the apparatus of the present invention.

Referring more particularly to FIG. 1, there is shown an adjustable platform 10 which is supported at mountings A, B, and C by means of geared mounting nuts 14, 16, and 18. These nuts are threadedly engaged with stationary lead screws 20, 22, and 24 which are rigidly fastened to a fixed support plate 26 by means of mounting nuts 28, 30, and 32. The nuts 14, 16, and 18 are rotatably adjustable to provide vertical motion by means of adjustment drive pinion gears 34, 36, and 38 which are respectively driven through pinion drive shafts 40, 42, and 44. Each of these drive shafts is provided with a driving gear, 46, 48, and 50. These gears are all driven by a single pinion gear 52 through a shaft 54 from a drive disk. Disk 56 is driven by a motor 58 through frictional engagement of a motor driven wheel 60 with the disk 56.

The apparatus to be positioned may be mounted upon the platform 10. As illustrated in FIG. 1, this apparatus consists of a lens actuator 62 having a reciprocal mounting arm 64 which supports and positions a focusing lens 66. In order to simplify the drawings, the other components associated with the optical system of the lens 66 are not illustrated.

In operation, the driving gears 46, 48, and 50 are simultaneously driven by the pinion gear 52 to thereby drive the mounting nuts 14, 16, and 18 through the pinions 34, 36, and 38. The nuts 14, 16, and 18 are thereby vertically adjusted by rotation on the lead screws 20, 22, and 24 to provide for vertical adjustment of the platform 10 in a series of mutually parallel planes. The plane of each position of platform 10 is parallel to each of the other planes of position of platform 10 because of the simultaneous adjustment of the mounting nuts 14, 16, and 18. While the nuts 14, 16, and 18, including the outer gear portions, move up and down in a vertical direction, they are thick enough in the vertical dimension so that they do not disengage from the associated driving pinions 34, 36, and 38. The anticipated vertical movement of each of the nuts 14, 16, and 18 is limited so that it does not exceed the thickness of the geared outer portions of each of these nuts plus the thickness of the associated drive pinions 34, 36, and 38.

To provide friction-free operation of the mountings A, B, and C, even though there is rotation of the nuts 14, 16, and 18 with respect to the associated portions of the platform 10, each of the mountings A, B, and C includes a specially constructed anti-friction bearing which is substantially free of any lost motion. This bearing construction is shown in more detail in the following figures and described in connection herewith.

In addition, mounting B includes special structure permitting one degree of freedom of relative motion between the platform 10 and the mounting B positioning nuts 16 in a direction parallel to the platform 10 and in a direction aligned with the mounting. This is schematically indicated by the arrow at 63. Additionally, the mounting C provides for two degrees of freedom of adjustment in a plane substantially parallel to the platform 10 for relative adjustment movement between the platform 10 and the mounting nut 18. This is schematically indicated by the double arrow at 65. This lateral freedom parallel to the plane of platform 10 at the mountings B and C is necessary to accommodate for tilting adjustments of the platform 10, as described in more detail below.

The drive gears 46, 48, and 50 are preferably locked to the shafts 40, 42, and 44 by means of tapered connections and locking nuts 68, 70, and 72. In order to accomplish a tilting adjustment of the positional attitude of the platform 10, it is possible to loosen any one of the gears 46, 48, and 50 from its tapered joint connection with the respectively associated shafts 40, 42, and 44 by loosening the associated lock nuts 68, 70, and 72. The lower tips of the shafts 40, 42, and 44 are each provided with opposed flattened portions as indicated at 40A, 42A, and 44A which may be engaged by a conventional wrench for individual rotational adjustment after the associated shaft is disengaged from the associated drive gear by loosening of the associated locking nut. After the desired tilting adjustment of the positional attitude of the platform 10 is established, each of the nuts 68, 70, and 72 is again tightened. The apparatus is then ready for the required motorized adjustments through simultaneous operation of the mounting nuts 14, 16, and 18 from the motor 58 at a series of planes at the new attitude.

Figure 2:
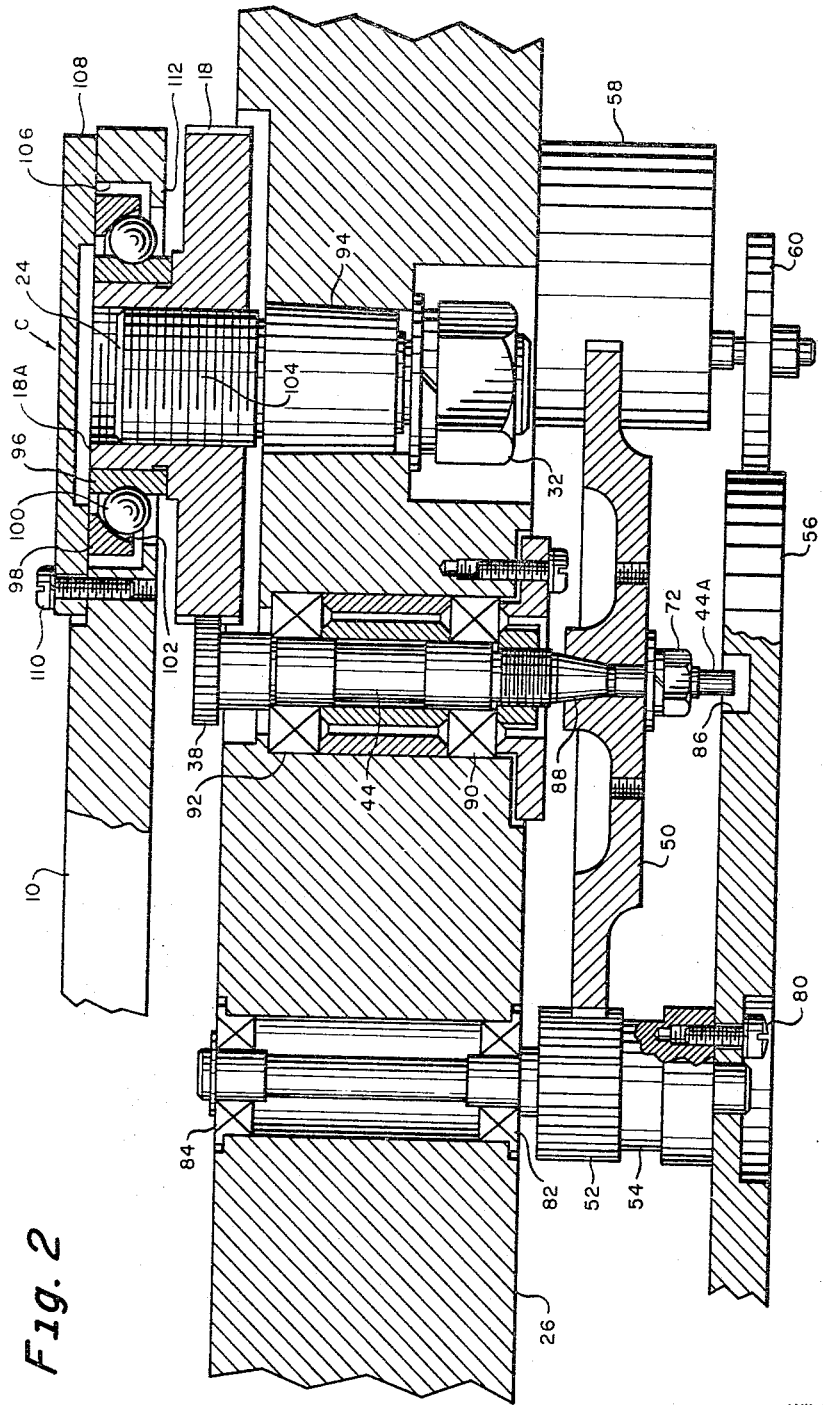
FIG. 2 is a cross-sectional detail view correctly proportioned (without vertical expansion) illustrating mounting C of the embodiment of FIG. 1, together with the associataed driving connections and apparatus.

FIG. 2 is a sectional detail view of a portion of the apparatus of the FIG. 1 drawn in correct proportions without the vertical expansion. The parts shown in FIG. 2 which correspond to parts shown in FIG. 1 are similarly identified. This figure discloses the details of the structure of mounting C and all of the components of the drive system which pertain to the adjusting movements of the mounting C.

The drive disk 56 is preferably fastened to its shaft 54 by screw threaded fastenings as shown at 80. The shaft 54 is preferably rotatably mounted and supported upon the fixed plate 26 by means of anti-friction bearings 82 and 84. The disk 56 is grooved at 86 to permit positioning of the disk at a greater proximity to the drive gear 50 by providing clearance for the lower shaft tip 44A.

As previously mentioned above, the drive gear 50 is adjustably attached to its shaft 44 by a tapered fitting. This tapered fitting is indicated at 88. When the nut 72 is tightened, the drive gear 50 is thereby securely locked to the associated shaft 44 by means of the tapered connection 88. However, if individual adjustment is desired, the nut 72 can be loosened, and it is then possible to rotate the shaft 44 independent of the gear 50 by engaging the shaft tip 44A with a suitable wrench, as described above. If necessary, the disk 56 may be removed for easy access to the shaft tip 44A.

The shaft 44 is rotatably mounted in the fixed plate 26 by means of suitable anti-friction bearings 90 and 92. The lead screw 24 is very securely positioned and mounted upon the fixed plate 26 by a tapered fit as indicated at 94. Tightening of the lead screw mounting nut 32 assures that the lead screw is very securely fastened and positioned at this tapered mounting.

The supporting nut 18 engages and supports the plate 10 through support C including an anti-friction bearing which is a ball bearing having an inner race 96, an outer race 98, and bearing balls 100. The inner race 96 is press fitted upon the upper end 18A of the nut 18. The inner race 96 is provided with a conventional central groove for the balls 100. A ball retainer is provided to maintain the balls in radial spaced relationship in the groove of the inner race 96, but such retainer is not shown in the drawing in order to avoid unnecessary drawing complexity. The outer race 98 is provided with a substantially spherical inner surface 102 which engages with balls 100. The center of the sphere of the spherical surface 102 is not critical, but may be located approximately at the point indicated at 104. This location is a function of the desired contact angle. It is apparent that the sphere center 104 is substantially displaced from the central plane passing through the centers of all of the balls of the bearing.

The outer race 98 is contained within a cylindrical recess 106 of the plate 10 and in slidable engagement at its upper surface with a retainer plate 108. The retainer plate 108 is securely fastened to the plate 10 by a series of screw threaded fastenings such as that indicated at 110. The opening 106 plate 10 is constricted by a lip portion 112, at the lower edge thereof, which has a smaller diameter than the outer diameter of the outer race 98. This is for retaining the outer race 98 within the recess 106 if the plate 10 is raised for the mounting C.

From the FIG. 2 drawing, and the description in the above paragraphs, it is clear that the mounting C provides a relatively rotatable support from the supporting nut 18 through the inner race 96 of the ball bearing, the balls 100, the outer race 98, the retainer plate 108, to the platform 10. Because of the spherical bearing surface 102 of the outer race 98, the vertical thrust forces of the load of the platform 10 causes the balls 100 of the ball bearing to be closely and securely engaged between the inner race 96 and the outer race 98 so that there is absolutely no lost motion or "play" between them. Furthermore, the spherical bearing surface 102 accommodates perfectly for any tilting adjustment of the platform 10 which takes the platform out of a plane which is perfectly perpendicular to the axis of the bearing.

If disassembly of the apparatus is necessary, such as for cleaning or servicing, the platform 10 may be lifted from the mounting C, and the lip portion 112 at the bottom of the bearing opening 106 engages and raises the outer race 98 so that the bearing is disassembled at the spherical bearing surface 102, the outer race going with the mounting plate 10, and the balls 100 and the inner race 96 remaining with the mounting nut 18.

Because of the fact that the bore 106 in the plate 10 is larger than the outer diameter of the outer race 98, the mounting C incorporates two degrees of freedom for movement of the plate 10 with respect to the mounting nut 18 at the plane defined by the underside of the retainer 108. Thus, the retainer 108 slidably engages the upper surface of the outer race 98, and if any lateral motion of the platform 10 is required for any reason, it is accommodated in this connection. Such adjustment may be required for thermal expansion or contraction, or in connection with tilting adjustment of plate 10.

The structure of the mounting A is virtually identical to that shown in FIG. 2 for mounting C, with one exception. In the mounting A, there is no space between the inner surface of the bore corresponding to 106 and the outer surface of the outer race corresponding to 98. The outer race is press-fitted into the bore so that there are no degrees of lateral freedom for adjustment movement therebetween. Since this is the only difference between the structure of mounting A and the structure of mounting C, no detail drawing is given here for the structure of mounting A.

The mounting B is substantially different in the structure of the outer ball bearing race and the connections of that race to the platform 10. These differences in structure are illustrated in the detail drawings of FIGS. 3, 3a, and 3b. The remainder of the structure associated with mounting B is substantially the same as that shown in FIG. 2 for mounting C.

Figure 3A:
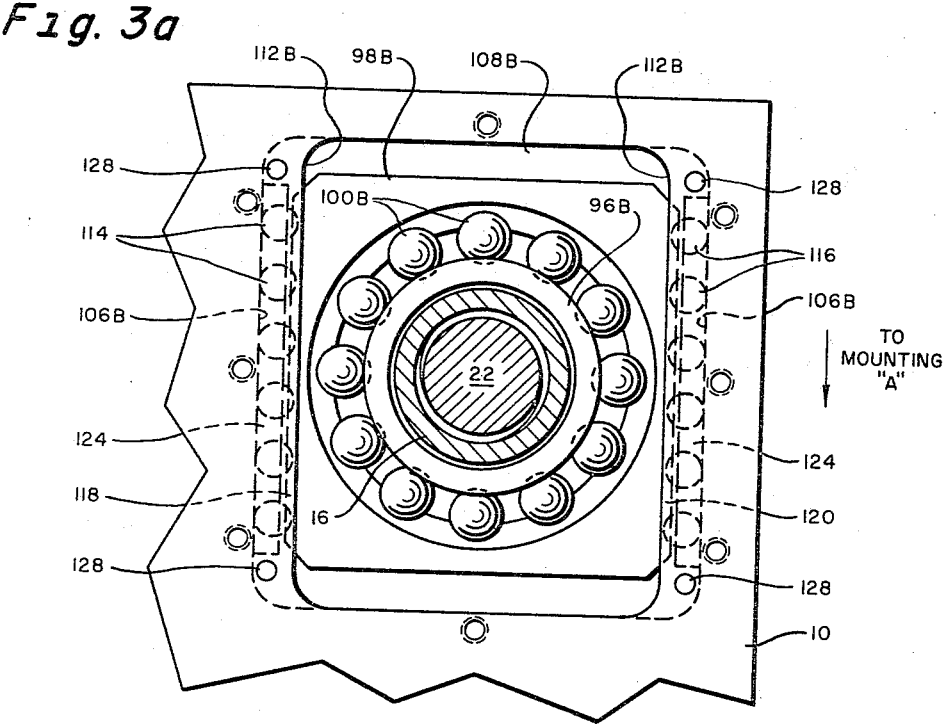

FIGS. 3, 3a, and 3b illustrate details of the structure of mounting B. In these figures, parts previously shown are numbered as before, and parts directly corresponding to similar parts shown in FIG. 2 are similarly numbered, but with the suffix "B." In the special features of the structure of mounting B, the outer ball bearing race 98 transmits support to the platform 10 through a translational ball bearing having two parallel sets of bearing balls 114 and 116. These balls are each arranged in a straight row.

FIG. 3a is a bottom sectional view taken at section 3a—3a of FIG. 3. Reference should be made to FIG. 3a concurrently with FIG. 3 as the description of FIG. 3 proceeds.

As best shown in FIG. 3a, the translational bearing balls 114 and 116 are lined up in directions which are mutually parallel and generally in a direction parallel to a direction of alignment with mounting A. Thus, the anti-friction bearing formed by the bearing balls 114 and 116 provides a single degree of freedom of lateral adjustment motion between the mountings A and B to accomodate for any other adjustments which may be necessary for any other reasons such as thermal expansion of platform 10. Because of the anti-friction features of these bearings, any such lateral adjustment is accomplished smoothly and without any friction "sticking."

The bearing surfaces against which the bearing balls 114 and 116 operate are the slanted plane surfaces indicated at 118 and 120 at the upper corners of the outer race 98B, the straight side wall surfaces 106B of the mounting opening of the platform 10, and the undersurface 122 of the retainer plate 108B. It is quite apparent that because of the cooperation of these particular bearing surfaces, and particularly the slanted plane bearing surfaces 118 and 120, there will be no lost motion in the bearing support provided by the ball bearings 114 and 116 in a direction transverse to the direction of alignment of these translational bearings. Thus, the bearing provided by this double row of bearing balls 114 and 116 provides an anti-friction bearing with substantially no lost motion and which is self compensating for wear of the bearing surfaces. This is actually an anti-friction form of V-groove bearing and may be characterized as such.

FIG. 3b is a side detail view of a separator 124 which is employed in the mounting B to maintain the bearing balls 114 or 116 in spaced separated relationship, as shown in FIG. 3d. This separator 124 is provided with substantially round slotted openings 126 for accommodating the individual balls. The separators 124 are not rigidly fastened or mounted to the platform 10, but simply float in confinement in the space provided between the outer surfaces of the race 98B and the inner surfaces 106B of the mounting opening in platform 10. The separators 124 are restrained at the outer limits of longitudinal travel by four dowel pins 128 which are arranged at the opposite extremities of each of the separators 124 as shown in FIG. 3a. One of these dowel pins 128 is shown on the left side in FIG. 3 to illustrate the mode of fastening. They are each press-fitted into suitable openings in the lips 112B.

It will be appreciated that because of the spherical bearing surface 102 of the outer race 98 of the mounting C, as shown in FIG. 2, and the counterparts to be found in each of the mountings A and B, the circular roller bearings in each of the mountings A, B, and C constitute self-aligning angular contact anti-friction bearings. These bearings are capable of pivotal realignment without any impairment in the smoothness and effectiveness of operation. Furthermore, it is apparent that the inner race 96 may be provided with a spherical outer bearing surface as an alternative to the spherical inner bearing surface 102 of the outer race 98. Such a modification is fully effective in providing the self-alignment feature. In either case, there is a substantial advantage in addition to the angular adjustability of the spherical bearing surface. That is, the "take up" in any lost motion which otherwise is generally present in any anti-friction bearing, and particularly in any roller bearing.

While there have been other anti-friction bearings with spherical races to provide a self-alignment feature, so far as is known, all of these prior anti-friction bearings have been provided with a spherical bearing surface in which the center of the sphere of the spherical surface has substantially coincided with the center plane of the bearing. These bearings have not been truly angular contact bearings, but rather radial contact bearings. Thus, they have not provided any substantial axial thrust bearing load capacity. By contrast, the circular anti-friction bearings of the present invention are truly angular contact spherical anti-friction bearings because the center of the sphere of the spherical surface is substantially displaced from the center plane of the bearing itself, or stated differently, substantially displaced from a plane intersecting the line of contact of the balls of the roller bearing.

From the above description, it is apparent that the objectives of this invention have been met by the embodiment of the invention which is disclosed. Each of the mountings A, B, and C incorporate anti-friction bearings which have substantially no lost motion despite the fact that they retain their anti-friction characteristics. The platform 10 thus can be rapidly adjusted by operation of the motor 58 to various vertical positions, each of which is in a plane parallel to every other position. Tilting adjustment of the platform 10 is easily accomplished by the individual adjustment of the mountings. Any resulting changes in the transverse distances between mountings as measured along platform 10 are accommodated for by the single degree of freedom at mounting B, and the two degrees of freedom at mounting C. Any erratic frictional "sticking" in these lateral adjustments is substantially prevented by the translational anti-friction bearings incorporated in the mounting B. Again, these translational bearings do not introduce any lost motion into the mountings.

It will be seen that the objects set forth above, and others made apparent from the description, are efficiently obtained. Since certain changes may be made in carrying out the above-described construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention as herein described, and all statements of the scope of the invention which, as a matter of language, might be said to fall therebetween.

We claim:
1. A precision positioning system comprising:
   (a) a platform having at least three mountings;
   (b) mutually parallel driving screw means mechanically coupled to said mountings;
   (c) a common drive means for simultaneously driving said screw means to cause said platform to be translated in space in a direction substantially parallel with the longitudinal axis of said screw means, said common drive means including means for coupling said common drive means to said screw means and for selectively decoupling said common drive means from at least one particular one of said screw means to enable differential rotation of said particular one of said screw means with respect to said other screw means to change the attitude of said platform with respect to the longitudinal axis of said screw means.

2. The combination as set forth in claim 1 wherein said common drive means includes a first driving member, second, third, and fourth driven members coacting therewith, intermediate coupling means for coupling each of said driven members to an associated screw means and decoupling means for selectively decoupling said driven members from their associated intermediate coupling means to provide for individual rotation of these particular screw means associated with the decoupled driven members.

3. The combination as set forth in claim 2 wherein said decoupling means further comprises means for loosening said driven members with respect to their associated intermediate coupling means.

4. The combination as set forth in claim 3 wherein said decoupling means further includes a tapered spindle fitted within each of said driven members and clamping screw means coupled to each of said tapered spindles for loosening said tapered spindles from said driven members.

5. The combination as set forth in claim 1 wherein a first one of said mountings has two degrees of freedom with relation to said platform for adjusting movement transversely to its associated screw means and a second one of said mountings as one degree of freedom with relation to said platform for adjusting movement transversely to its associated screw means and in a direction in alignment with the third one of said mountings.

References Cited
UNITED STATES PATENTS

| | | | |
|---|---|---|---|
| 765,347 | 7/1904 | Vogel | 108—147 X |
| 799,878 | 9/1905 | Stockwell | 248—180 X |
| 2,030,813 | 2/1936 | Dolza | 308—194 X |
| 2,333,970 | 11/1943 | Annen | 308—194 |
| 2,377,563 | 6/1945 | Luenberger et al. | 248—23 |
| 2,461,190 | 2/1949 | Wolff | 248—180 |
| 3,239,169 | 3/1966 | Sloyan | 248—23 |

FOREIGN PATENTS

| | | |
|---|---|---|
| 1,024,480 | 1/1953 | France. |
| 1,333,785 | 6/1963 | France. |

ROY D. FRAZIER, *Primary Examiner.*

CLAUDE A. LE ROY, *Examiner.*

R. P. SEITTER, *Assistant Examiner.*